United States Patent [19]

Venkatesan et al.

[11] Patent Number: 4,487,262

[45] Date of Patent: Dec. 11, 1984

[54] DRIVE FOR HEAVY OIL RECOVERY

[75] Inventors: V. N. Venkatesan; Winston R. Shu, both of Dallas, Tex.

[73] Assignee: Mobil Oil Corporation, New York, N.Y.

[21] Appl. No.: 452,163

[22] Filed: Dec. 22, 1982

[51] Int. Cl.$^3$ .................... E21B 43/22; E21B 43/24
[52] U.S. Cl. .................................. 166/271; 166/272; 166/274
[58] Field of Search ............... 166/272, 273, 274, 275, 166/271, 270

[56] References Cited

U.S. PATENT DOCUMENTS

| | | | |
|---|---|---|---|
| 1,651,311 | 11/1927 | Atkinson | 166/274 X |
| 2,813,583 | 11/1957 | Marx et al. | 166/271 |
| 3,279,538 | 10/1966 | Doscher | 166/271 X |
| 3,853,178 | 12/1974 | Shen | 166/272 |
| 3,871,452 | 3/1975 | Sarem | 166/270 |
| 3,880,237 | 4/1975 | Snavely, Jr. | 166/272 X |
| 3,927,716 | 12/1975 | Burdyn et al. | 166/270 |

*Primary Examiner*—Stephen J. Novosad
*Attorney, Agent, or Firm*—Alexander J. McKillop; Michael G. Gilman; Stanislaus Aksman

[57] ABSTRACT

A method for the recovery of heavy oil from a subterranean silica-containing oil-containing formation comprising treating the formation with a slug of a hot aqueous solution containing sodium hydroxide and sodium bicarbonate capable of forming in-situ $CO_2$ and metasilicate followed by injection of a drive fluid to aid in recovering the oil.

4 Claims, No Drawings

DRIVE FOR HEAVY OIL RECOVERY

FIELD OF THE INVENTION

This invention relates to a method of recovery of heavy oil from a subterranean silica-containing oil-containing formation by fluid displacement and more particularly to pretreating such formations with a slug of fluid containing reactants capable of forming in-situ carbon dioxide and thereafter using a drive fluid such as a waterflood to displace and recover oil from the formation.

BACKGROUND OF THE INVENTION

There are vast reserves of heavy oil contained in subterranean formations whose natural characteristics such as high viscosity, low API gravity and high molecular weight result in the absence of primary production due to lack of natural reservoir energy. In addition, these reservoirs have relatively low permeability although they may have high porosity.

Attempts have been made to employ known oil displacement procedures for tertiary recovery of the oil by fluid injection through the formation between injection and production wells. These include waterflooding, miscible flooding, chemical or micellar flooding, polymer flooding, thermal recovery by ht fluid injection, thermal recovery by in-situ combustion, solvent flooding, etc., which are well known to those skilled in this art for improving the mobility of the oil, thereby enhancing the recovery of heavy oil.

Among these recovery techniques, the miscible flooding process using carbon dioxide has often been used for enhanced oil recovery. The $CO_2$ miscible process is often applicable to high gravity crude oils, e.g., 25 degree API, and involves high operating pressures (starting at about 1500 psi and upward). These particular conditions under which the process is practiced produce true miscibility of oil or hydrocarbon with $CO_2$ thus forming a single phase.

At present, there is increasing interest in the application of carbon dioxide gas for reducing the viscosity of heavy oils thus causing a decrease in the effect of viscous forces associated with the in-situ recovery of heavy oils.

One of the most widely used supplemental recovery techniques is waterflooding which involves the injection of water into an oil-containing formation. As the water moves through the formation, it acts to displace oil therein to a production system composed of one or more wells through which the oil is recovered. It has also been proposed to add surfactants to the injected water to lower the oil-water interfacial tension and/or alter the wettability characteristics of the formation rock to enhance recovery of the oil. Various surfactant waterflooding techniques are disclosed in U.S. Pat. No. 3,469,630 to Hurd et al and U.S. Pat. No. 3,977,470 to Chang.

Another waterflood technique is taught in U.S. Pat. No. 3,757,861 to Routson which discloses the introduction into the formation of an aqueous solution of peroxide, typically hydrogen peroxide, and thereafter or simultaneously introducing an aqueous solution of alkali metal hydroxides or carbonates or ammonium hydroxide.

U.S. Pat. No. 3,532,165 discloses a method of generating in-situ $CO_2$ in an oil-bearing formation by injecting therein aqueous solutions of hot sodium carbonate or bicarbonate and sodium sulfite or bisulfite. Thereafter, the formation is subjected to a fluid drive such as water-steam and oil is recovered from the formation.

In this process, a slug of a hot aqueous solution containing sodium hydroxide and sodium bicarbonate is injected into a silica-containing formation which reacts with the silica to form metasilicate, carbon dioxide and thermal energy to decrease the viscosity of the in place oil and reduce the residual oil saturation. Thereafter, the formation is subjected to a fluid drive such as waterflooding to effectively recover the oil reduced in viscosity from the formation.

SUMMARY OF THE INVENTION

In accordance with the present invention, a subterranean silica-containing heavy oil-containing formation is treated with a slug of a hot aqueous solution containing sodium hydroxide and sodium bicarbonate to form metasilicate, $CO_2$ and thermal energy which decreases the viscosity of the in place heavy oil and leaves lower residual oil saturation in the oil sand system thereby enhancing the recovery of the oil from the formation by a subsequent fluid drive such as waterflooding.

In carrying out the invention, a subterranean silica-containing heavy oil-containing formation is penetrated by at least one injection well and at least one spaced-apart production well. Both the injection and production wells are in fluid communication with a substantial portion of the formation and have a communicating relationship with each other. Initially, a slug of hot aqueous solution containing sodium hydroxide and sodium bicarbonate in the range of 0.5 to 1.0 pore volume is injected into the formation via the injection well. The solution has a pH of above 11.0. The concentration of sodium hydroxide is sufficient to provide a molar ratio of sodium bicarbonate to sodium hydroxide of not greater than about 3.3:1 in the solution mixture. The concentration of sodium bicarbonate and sodium hydroxide corresponds to their saturated concentration at the injected temperature of the solution. The sodium hydroxide and sodium bicarbonate in the injected hot aqueous solution react separately with the silica contained in the formation as follows:

$$2\ NaHCO_3 + SiO_2 \rightarrow Na_2SiO_3 + H_2O + 2\ CO_2 \qquad (1)$$

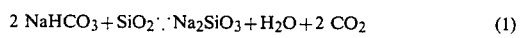

$$\Delta H_{25^\circ C.} = +3.7\ \text{Kcals/mole of}\ NaHCO_3$$

$$2\ NaOH + SiO_2 \rightarrow Na_2SiO_3 + H_2O \qquad (2)$$

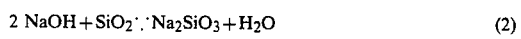

$$\Delta H_{25^\circ C.} = -12.3\ \text{Kcals/mole of}\ NaOH$$

Reaction (1) is endothermic and reaction (2) is exothermic. The molar ratio of sodium bicarbonate to sodium hydroxide is therefore maintained not greater than about 3.3:1 to maintain an overall energy balance. The carbon dioxide dissolves in the oil in the formation reducing its viscosity and the metasilicate which is readily soluble in water lowers the interfacial tension between the oil and the formation thereby enhancing recovery of the oil. Thereafter, a driving fluid such as hot water is injected into the formation via the injection well to displace the mobilized oil through the formation toward the production well from which the oil is recovered.

DESCRIPTION OF THE PREFERRED EMBODIMENT

In accordance with the present invention, a subterranean formation containing heavy oil and silica is penetrated by at least one injection well and at least one spaced-apart production well. Both the injection and production wells are in fluid communication with a substantial portion of the formation and the injection and production wells have a communicating relationship. If the formation does not possess natural or naturally occurring permeability that fluid may be injected into the formation at a satisfactory rate and pass therethrough to spaced apart wells without danger of causing plugging or other fluid flow-obstruction phenomena occurring, then a fluid path must first be established in the formation between the injecton well and the production well by conventional means such as hydraulic fracturing, see U.S. Pat. No. 4,265,310.

Once fluid communication between the injection well and the production well has been established, a hot aqueous solution containing sodium hydroxide and sodium bicarbonate is injected into the formation via the injection well. The hot aqueous solution has a pH of above 11 and contains a sodium bicarbonate to sodium hydroxide molar ratio of not greater than about 3.3:1. The solution preferably contains a saturated concentration of sodium bicarbonate and sodium hydroxide at the injected temperature of the solution. The amount of solution injected is at least about 0.3 pore volume and preferably from about 0.5 to about 1.0 pore volume of the formation to be treated.

The injection of the hot aqueous sodium hydroxide/sodium bicarbonate solution into the formation causes the silica present in the formation under formation conditions to form carbon dioxide according to the following reactions:

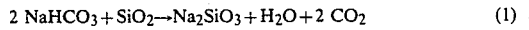
$$2\ NaHCO_3 + SiO_2 \rightarrow Na_2SiO_3 + H_2O + 2\ CO_2 \quad (1)$$

$$\Delta H_{25^\circ C.} = +3.7\ \text{Kcals/mole of } NaHCO_3$$

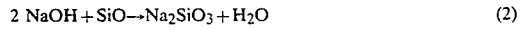
$$2\ NaOH + SiO \rightarrow Na_2SiO_3 + H_2O \quad (2)$$

$$\Delta H_{25^\circ C.} = -12.3\ \text{Kcals/mole of } NaOH$$

Reaction (1) is endothermic, +3.7 Kcals/mole of $NaHCO_3$, and reaction (2) is exothermic, −12.3 Kcals/mole of NaOH. As seen from reactions (1) and (2), nearly one-third mole of NaOH is needed per mole $NaHCO_3$ injected in reaction (1) to maintain an overall energy balance. Therefore, the molar ratio of sodium bicarbonate and sodium hydroxide in the hot fluid mixture must be not greater than about 3.3:1.

The metasilicate that is formed by reactions (1) and (2) is readily soluble in water and leaves lower residual the formation, saturation of oil, thereby enhancing recovery of the oil. The rate of dissolution of silica by reaction (2) is higher than by reaction (1) due to higher pH conditions favoring reaction (2). However, by injecting hot fluids mixture of NaOH and $NaHCO_3$, the reaction rate of equation (1) is accelerated and the extent of $CO_2$ released is increased. The $CO_2$ released by reaction (1) dissolves into the oil thereby lowering its viscosity. The hot temperature of the injected fluids also has a synergistic effect in lowering the viscosity of the oil. As described above, the pH of the injected solution is maintained above 11.0 to increase the reaction rate of silica in reactions (1) and (2).

After the desired amount of the hot aqueous solution of sodium hydroxide and sodium bicarbonate has been injected into the formation, a driving fluid such as hot water is injected into the formation via the injection well to drive the mobilized oil through the formation to the production well from which it is recovered. Injection of the hot water is continued and fluids including oil are recovered from the formation via the production well until the amount of oil being recovered is unfavorable.

In a slightly different embodiment, additional slugs of the hot aqueous sodium hydroxide/sodium bicarbonate solution as described above may be periodically injected into the formation for a plurality of cycles during production in an amount within the range of 0.5 to 1.0 pore volume.

By the term "pore volume" as used herein, is meant that volume of the portion of the formation underlying the well pattern employed as described in greater detail in U.S. Pat. No. 3,927,716 to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any patterns, may be applied in using the present method as illustrated in U.S. Pat. No. 3,937,716 to Burdyn et al.

It is understood that various changes in the details described to explore the invention can be made by persons skilled in the art within the scope of the invention as expressed in the appended claims.

What is claimed is:

1. A method for the recovery of heavy oil from a subterranean silica-containing oil-containing formation penetrated by at least one injection well and at least one spaced-apart production well, both of said injection and production wells being in fluid communication with a substantial portion of said formation, and such wells having a communicating relationship, comprising:
   (a) injecting into the formation via said injection well a predetermined amount of a hot aqueous solution having a pH of above 11.0 and containing sodium hydroxide and sodium bicarbonate, the concentration of said sodium hydroxide being sufficient to provide a molar ratio of sodium bicarbonate to sodium hydroxide not greater than about 3.3 to 1, said sodium bicarbonate reacting with said silica contained in the formation under conditions in the formation to form water-soluble sodium silicate, water and carbon dioxide and said sodium hydroxide reacting with said silica contained in the formation under conditions in the formation to form water-soluble sodium silicate and water plus the thermal energy necessary to provide the heat of reaction required between the sodium bicarbonate and the silica, said in-situ formed carbon dioxide dissolving in the oil reducing its viscosity and the water-soluble sodium silicate lowering the residual oil saturation of the formation;
   (b) injecting a driving fluid into the formation via said injection well to displace said mobilized oil through the formation toward said production well; and (c) recovering oil from the formation via said production well.

2. The method of claim 1 wherein the concentration of sodium bicarbonate and sodium hydroxide solution is saturated at the injection temperature and the amount of solution injected into the formation is about 0.5 to 1.0 pore volume.

3. The method of claim 1 wherein the driving fluid is hot water.

4. The method of claim 1 wherein the injection of the slug of the aqueous solution of sodium hydroxide and sodium bicarbonate according to step (a) is repeated for a plurality of cycles during production.

* * * * *

UNITED STATES PATENT AND TRADEMARK OFFICE
CERTIFICATE OF CORRECTION

PATENT NO. : 4,487,262
DATED : December 11, 1984
INVENTOR(S) : V.N. VENKATESAN and W.R. SHU It is certified that error appears in the above-identified patent and that said Letters Patent is hereby corrected as shown below:

Column 1, line 27: "ht" should be --hot--.

Column 2, line 46 (Equation 1): " $\rightleftharpoons$ " should be -- $\longrightarrow$ --.

Column 2, line 48 (Equation 1): "$\Delta H_{25°C.}$" should be -- $\Delta H_{25°C}$ --

Column 2, line 50 (Equation 2): " $\rightleftharpoons$ " should be -- $\longrightarrow$ --.

Column 2, line 52 (Equation 2): "$\Delta H_{25°C.}$" should be -- $\Delta H_{25°C}$ --

Column 3, line 41 (Equation 1): "$\Delta H_{25°C.}$" should be -- $\Delta H_{25°C}$ --

Column 3, line 43 (Equation 2): "SiO" ahould be --$SiO_2$--.

Column 3, line 45 (Equation 2): "$\Delta H_{25°C.}$" should be -- $\Delta H_{25°C}$ --

Column 3, line 53: "and" should be --to--.
Column 4, line 51: after "hydroxide" insert --of--.

Signed and Sealed this

Twenty-eighth Day of May 1985

[SEAL]

Attest:

DONALD J. QUIGG

Attesting Officer    Acting Commissioner of Patents and Trademarks